June 29, 1954  L. G. LINDSAY  2,682,386
VALVE MECHANISM
Filed Dec. 13, 1948
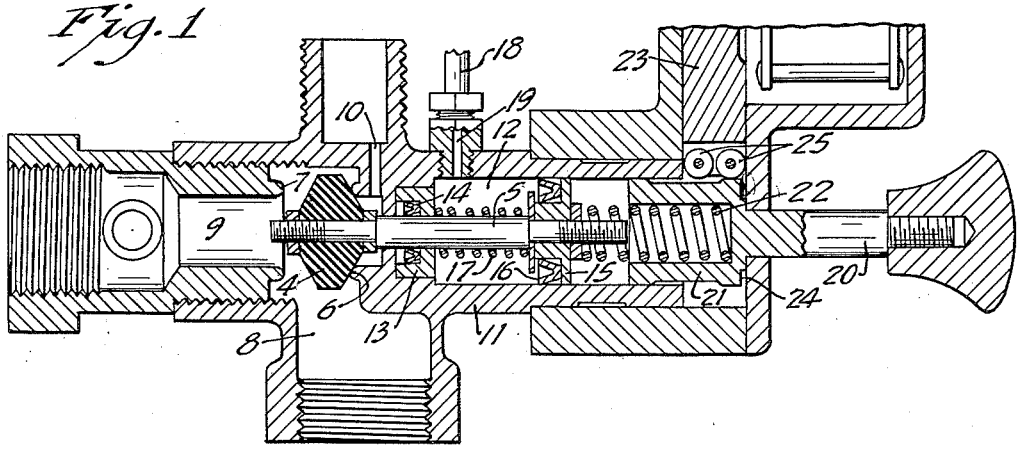
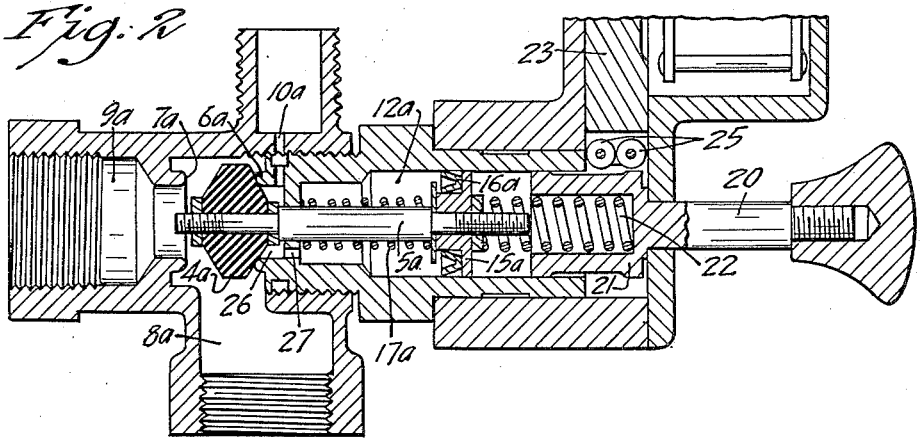
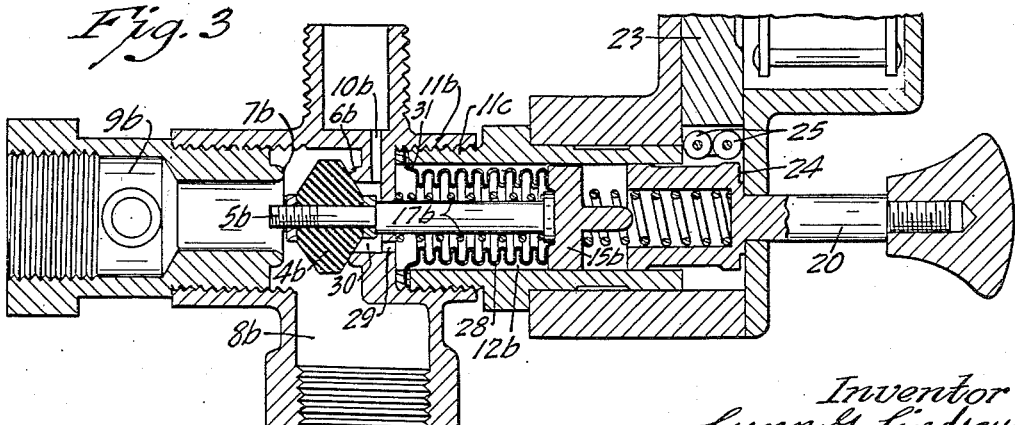
Inventor
Lynn G. Lindsay
By John E. Stryker
Attorney Patented June 29, 1954

2,682,386

UNITED STATES PATENT OFFICE 2,682,386

VALVE MECHANISM

Lynn G. Lindsay, St. Paul, Minn., assignor to The Lindsay Company, St. Paul, Minn., a corporation of Minnesota Application December 13, 1948, Serial No. 65,023

4 Claims. (Cl. 251—74)

This invention relates to valves of the automatic or semi-automatic type having mechanism for temporarily holding a valve closure member in one position and for releasing it to another position, and particularly to pressure balancing means adapted to insure proper operation of the valve closure member against fluid pressure tending to hold it in a closed position.

It is an object of my invention to provide a valve of the class described having a closure member which is subjected to fluid pressure tending to hold it in a closed position in combination with novel pressure balancing means comprising a piston which is subjected to oppositely directed fluid pressure and operatively connected to the closure member whereby the pressure on the closure member is substantially balanced by pressure in the opposite direction on the piston.

A further and particular object is to provide a valve of the class described adapted to control the flow of solutions or liquids containing solid matter which may be deposited on the internal surfaces of the valve and having pressure balancing means including a piston and pressure chamber containing the piston and means for guarding against interference with the operation of the piston caused by deposits of solid matter in the piston chamber.

Other objects will appear and be more fully pointed out in the following specification and claims.

Referring to the accompanying drawing which illustrates, by way of example and not for the purpose of limitation, a preferred and two modified forms of my invention:

Figure 1 is a central longitudinal section through a valve embodying one form of the invention, together with a fragmentary portion of suitable latch mechanism;

Fig. 2 is a similar sectional view showing a modified form of the invention, and Fig. 3 is a similar sectional view showing a further modification of the invention.

As shown in Fig. 1 of the drawing, the invention may be applied to a three-port, two-way valve having a closure member in the form of a head 4 fixed on one end of a rod 5 which is movable longitudinally to actuate the head 4 to close either against an annular seat 6 or against a similar and oppositely disposed seat 7 to control the passage of fluid under pressure from an inlet port 8, either to an outlet port 9 or to an outlet port 10. Each of these ports communicates with a tubular member of the valve casing adapted to be connected to a conduit in suitable manner. The valve casing indicated generally by the numeral 11 is formed with a cylindrical chamber 12 which is separated from the port passages for fluid by a bearing wall member 13 through which the rod 5 passes and this wall member is formed with an annular recess containing a flexible sealing member 14.

Fixed on the rod 5 in spaced relation to the head 4 is a piston 15 which fits slidably in the chamber 12 and is provided with an annular sealing member 16 of suitable flexible material and preferably of substantially V shape in cross section, as shown. A coiled spring 17 is mounted on the rod 5 between the bearing member 13 and piston 15 and is arranged to bias the head 4 toward closed position on the seat 6. Provision is made for supplying a fluid under pressure to the chamber 12 through a small pipe 18 extending to a suitable source of fluid under pressure. The pipe 18 communicates with the chamber 12 through a passage 19 formed in a fitting connecting the pipe to the valve casing.

A manually actuatable plunger 20 is provided for moving the head 4 to closed position on the seat 7 and latch mechanism is provided for holding the head in this closed position. The plunger 20 has an enlarged inner end portion 21 which is slidable in a bore of the valve casing 11 and contains a relatively heavy coiled spring 22 which bears against the outer face of the piston 15 to transmit motion from the plunger 20 to the piston and members connected thereto. Latch mechanism for temporarily holding the valve head 4 in closed position on its seat 7 and for automatically releasing the actuating mechanism to allow the valve head to close against its seat 6 may comprise a radially movable latch member 23 adapted to project in the path of an annular shoulder 24 formed on the plunger portion 21. A pair of anti-friction rollers 25 are carried by the lower end portion of the latch member 23 for engagement with oppositely disposed guide surfaces extending perpendicularly to the axis of the plunger 20 and also for engagement with the shoulder 24. When the plunger 20 is moved to the left to close the head 4 on its seat 7, the latch member 23 is projected to engage the shoulder 24 and to temporarily hold the valve mechanism in this closed position. Suitable time control mechanism for causing the latch member 23 to be withdrawn from its extended position in engagement with the shoulder 24 is described and illustrated in my application for patent Serial No. 52,551, filed October 2, 1948, now Patent No. 2,610,147, issued September, 1952. Other types of valve release mechanism may be provided within the spirit of the present invention as defined in the appended claims.

In operation, with the port 8 connected to a suitable source of fluid under pressure, this port is in communication with the port 9 and is cut off from communication with the port 10 when the valve head 4 is in the closed position on the seat 6. The head 4 is normally held in this closed position both by the pressure exerted by the fluid flowing through the valve casing and by the spring 17 which biases the head 4 toward its seat 6. To cut off communication between the ports 8 and 9 and establish communication between the ports 8 and 10, the plunger 20 is actuated to close the head 4 at its seat 7. This compresses the spring 22 and moves the plunger portion 21 to bring the shoulder 24 in position for engagement with the antifriction rollers 25 of the latch member 23. This latch member is now extended to hold the valve mechanism with the head 4 closed against the seat 7. When in this position the head 4 is subjected to fluid pressure tending to hold it on the seat 7 and to oppose expansion of the spring 17. In order to offset such pressure and permit free movement of the valve to open position relative to the seat 7, a fluid under pressure is admitted to the chamber 12 through the pipe 18, either from a common source with the fluid flowing in through the port 8 or from a separate and independent source, in order to avoid deposits of solid material in the chamber 12. Fluid pressure is thus established in the chamber 12 sufficient to balance the pressure tending to hold the head 4 on its seat 7. This insures quick and reliable operation of the valve mechanism to open communication between the ports 8 and 9 when the latch member 23 is withdrawn from the path of shoulder 24 on the plunger. It will be evident that in the form of the invention shown in Fig. 1, the chamber 12 is sealed off from the passages for fluid from port 8 to ports 9 and 10 and leakage between the piston 15 and walls of the chamber 12 is prevented by the sealing member 16.

In the form of my invention shown in Fig. 2, the mechanism is similar to that shown and described with reference to Fig. 1, except that a chamber 12a containing a piston 15a shown in Fig. 2 is continuously in communication with an annular chamber 26 through a passage 27 formed in a bearing wall for the valve rod and fluid under pressure is supplied to the chamber 12a solely through the passage 27. By this arrangement, when valve head 4a is in closed position on its seat 7a, fluid under pressure for port 8a is supplied to the chamber 12a through the chamber 26 and passage 27. Fluid pressure is applied to a sufficient area of the piston 15a to substantially balance the pressure tending to hold the head 4a in closed position on its seat 7a during the period when communication is established between port 8a and a port 10a which communicates with the chamber 26. This form of the invention is particularly adapted for use where the fluid supplied to the valve casing is not of such nature as to deposit solid matter on the walls of the chamber 12a. Otherwise, the operation of the invention shown in Fig. 2 is similar to that described with reference to Fig. 1.

In the form of the invention shown in Fig. 3, the valve head 4b is fixed on an end of a rod 5b, the opposite end of which carries a piston 15b. In this case the piston 15b is movable in a chamber 12b and sealing means are provided between the walls of this chamber and the piston comprising an annular flexible bellows 28 extending between the rod 5b and walls of the chamber 12b and containing the spring 17b for biasing the valve head toward closed position at its seat 6b. Fluid is supplied to the interior of the bellows 28 through a passage 29 adapted to communicate with the port 8b through an annular chamber 30 which also communicates with the outlet port 10b. The end of the bellows 28 adjacent to the passage 29 has an annular flange 31 which is fastened in sealing relation to the walls of the chamber 12b. The fastening and sealing connection for the bellows may comprise a gasket overlying the flange 31 and confined between an annular shoulder formed on a valve casing member 11b and a coacting casing member 11c, having a threaded connection with the member 11b. At its opposite end, the bellows 28 is closed and extends between the head of the rod 5b and piston 15b. When the head 4b is closed at its seat 7b and open at its seat 6b, fluid passes from the inlet port 8b to the outlet port 10b through the chamber 30 and fills the bellows 28 through the passage 29. The pressure exerted on these bellows tends to actuate the piston 15b to the right and balances the pressure exerted on the head 4b in the opposite direction. The bellows 28 may be constructed from suitable thin metal and are sufficiently flexible and compressible to allow the piston 15b to move as far as necessary in the chamber 12b. It will be evident that the bellows 28 perform the function of excluding the fluid contained therein from the walls of the chamber 12b with which the piston 15b makes contact. Thus the bellows guard against interference with the free movement of the piston 15b, after a period of use, as a result of deposits of solid matter from the fluid passing through the valve casing.

My improved valve mechanism may be used to control the flow of fluids for various purposes. For example, it may be used as a control for water softening apparatus requiring periodic regeneration. In such case the inlet port 8 (or 8a or 8b of the modified forms) may be connected to the soft water outlet of the softening tank, the port 9, 9a or 9b may be connected to the service pipe and the port 10, 10a or 10b may be arranged to discharge into a drain or waste pipe. When the softening material is to be regenerated, the brine or other regenerating material is passed through the water softening tank and thence to waste through the valve casing of the present invention. For this operation, the valve head 4 is closed against its seat 7 and is held in this closed position during the regenerating and flushing period. The spent brine and flushing water is thus caused to enter through the port 8 and to be discharged through the port 10 past the valve seat 6.

The pipe 18 is preferably connected to the hard water supply pipe so that water under pressure substantially equal to that in the port 8 is admitted to the chamber 12 where it exerts sufficient pressure on the piston 15 to offset or balance the pressure exerted in the opposite direction on the head 4 tending to hold this head closed on its seat 7. Ordinarily pressure in the service pipe will be reduced to substantially zero by the opening of a service outlet after the valve head 4 has been closed at its seat 7 and in the absence of my balancing device the fluid pressure on the pressure side of the head 4 would be sufficient to prevent the expansion of the spring 17 and movement of the valve to open position when the plunger 20 is released by the latch 23. By the present invention I insure quick and proper operation of the valve when the latch mechanism releases it to permit expansion of the spring 17.

Having described my invention, what I claim as new and desire to protect by Letters Patent is:

1. In a valve, a casing having passages for fluid and a seat for a valve head, a head movable to and from said seat, said seat and head being so disposed in relation to said passages as to control the flow through said passages, a piston operatively connected to said head, a chamber containing said piston, spring means arranged to bias said head continuously toward open position relative to said seat and a latch for holding said head in closed position on said seat against the bias of said spring means, said head being subject to fluid pressure tending to hold it in closed position on said seat when closed thereon and said piston having an area subject to fluid pressure in said chamber which is so related and opposed to the area of said head subject to pressure tending to hold it on its seat as to assist said spring in actuating said head to an open position relative to its seat when released by said latch.

2. In a valve, a casing having passages for fluid and a seat for a valve head, a head movable to and from said seat, said seat and head being so disposed in relation to said passages as to control the flow through said passages, a longitudinally movable rod operatively connected to said head, a piston operatively connected to said rod, a chamber containing said piston, means for sealing off said chamber from said passages whereby the fluid flowing in said passages is excluded from said chamber, spring means arranged to bias said head continuously toward open position relative to said seat, means for supplying fluid under pressure from a remote source to said chamber and a latch for holding said head in closed position on said seat against the bias of said spring means, said head being subject to fluid pressure tending to hold it in closed position on said seat when closed thereon and said piston having an area subject to fluid pressure in said chamber which is so related and opposed to the area of said head subject to pressure tending to hold it on its seat as to assist said spring in actuating said head to an open position relative to said seat.

3. In a valve, a casing having passages for fluid and a seat for a valve head, a head movable to and from said seat, said seat and head being so disposed in relation to said passages as to control the flow through said passages, a longitudinally movable rod operatively connected to said head, a piston operatively connected to said rod in spaced relation to said head, a chamber formed in said casing and extending between said head and piston to slidably receive said piston, a releasable latch means for holding said head in closed position on said seat, spring means arranged to bias said head continuously toward open position relative to said seat, said head being subject to fluid pressure tending to hold it in closed position on the seat and sealing means interposed between said piston and casing for confining fluid in said chamber, said piston having an area subject to fluid pressure in said chamber which is so related and opposed to the area of said head subject to pressure tending to hold it on its seat as to substantially offset the pressure to which said head is subject by oppositely directed fluid pressure applied to said piston.

4. In a valve, a casing having passages for fluid and formed with a seat for a valve head, a head movable to and from said seat, said seat and head being so disposed in relation to said passages as to control the flow through said passages, a piston disposed in spaced relation to said head and operatively connected thereto, a chamber formed in said casing and extending between said head and piston to slidably receive said piston, releasable latch means for holding said head in closed position on said seat, spring means for actuating said head to open position relative to said seat, said head being subject to fluid pressure tending to hold said head in closed position on the seat when closed thereon and a flexible bellows disposed in said chamber to form a separate container for fluid and being expansible to actuate said piston to open said head relative to its seat, said bellows having an area subject to fluid pressure tending to actuate them which is so related and opposed to the area of said head subject to pressure tending to hold it on its seat as to substantially balance the fluid pressure forces tending to move said head.

References Cited in the file of this patent

UNITED STATES PATENTS

| Number | Name | Date |
|---|---|---|
| 663,727 | Christie | Dec. 11, 1900 |
| 930,860 | Horridge | Aug. 10, 1907 |
| 902,096 | Love | Oct. 27, 1908 |
| 1,554,453 | Matschull | Sept. 22, 1925 |
| 1,623,557 | Rybeck | Apr. 5, 1927 |
| 1,764,991 | Siebs | June 17, 1930 |
| 1,937,246 | Reedy | Nov. 28, 1933 |
| 1,995,561 | Belanger | Mar. 26, 1935 |
| 2,347,202 | Lindsay | Apr. 25, 1944 |
| 2,360,612 | Ludeman | Oct. 17, 1944 |
| 2,396,809 | Addison | Mar. 19, 1946 |

FOREIGN PATENTS

| Number | Country | Date |
|---|---|---|
| 11,037 | Great Britain | 1910 |
| 17,089 | Great Britain | 1908 |